(12) United States Patent
Du et al.

(10) Patent No.: US 8,577,095 B2
(45) Date of Patent: Nov. 5, 2013

(54) SYSTEM AND METHOD FOR NON-COOPERATIVE IRIS RECOGNITION

(75) Inventors: Eliza Yingzi Du, Indianapolis, IN (US); Craig Belcher, Indianapolis, IN (US)

(73) Assignee: Indiana University Research & Technology Corp., Indianapolis, IN (US)

( * ) Notice: Subject to any disclaimer, the term of this patent is extended or adjusted under 35 U.S.C. 154(b) by 148 days.

(21) Appl. No.: 13/257,523

(22) PCT Filed: Mar. 19, 2010

(86) PCT No.: PCT/US2010/027917
§ 371 (c)(1),
(2), (4) Date: Oct. 10, 2011

(87) PCT Pub. No.: WO2010/108069
PCT Pub. Date: Sep. 23, 2010

(65) Prior Publication Data
US 2012/0140992 A1    Jun. 7, 2012

Related U.S. Application Data

(60) Provisional application No. 61/161,572, filed on Mar. 19, 2009.

(51) Int. Cl.
*G06K 9/00* (2006.01)
(52) U.S. Cl.
USPC .......................................................... 382/117
(58) Field of Classification Search
None
See application file for complete search history.

(56) References Cited

U.S. PATENT DOCUMENTS

| | | | | |
|---|---|---|---|---|
| 5,867,587 | A * | 2/1999 | Aboutalib et al. | 382/117 |
| 7,044,602 | B2 * | 5/2006 | Chernyak | 351/208 |
| 7,920,724 | B2 * | 4/2011 | Che et al. | 382/117 |
| 2003/0098776 | A1 * | 5/2003 | Friedli | 340/5.8 |
| 2003/0152252 | A1 * | 8/2003 | Kondo et al. | 382/117 |
| 2003/0223037 | A1 * | 12/2003 | Chernyak | 351/209 |
| 2006/0147094 | A1 * | 7/2006 | Yoo | 382/117 |
| 2006/0210123 | A1 * | 9/2006 | Kondo et al. | 382/117 |
| 2007/0036397 | A1 | 2/2007 | Hamza | |
| 2008/0069410 | A1 * | 3/2008 | Ko et al. | 382/117 |
| 2008/0095411 | A1 | 4/2008 | Hwang et al. | |
| 2008/0219515 | A1 | 9/2008 | Namgoong | |
| 2008/0253622 | A1 | 10/2008 | Tosa et al. | |
| 2009/0060286 | A1 | 3/2009 | Wheeler et al. | |
| 2009/0169064 | A1 * | 7/2009 | Kim et al. | 382/117 |

OTHER PUBLICATIONS

International Searching Authority; International Search Report for PCT Application No. PCT/US/10/27917; Mailed May 27, 2010 (2 pages).
International Searching Authority; Written Opinion of the International Searching Authority for PCT Application No. PCT/US/10/27917; Mailed May 27, 2010 (3 pages).

* cited by examiner

*Primary Examiner* — Sean Motsinger
(74) *Attorney, Agent, or Firm* — Maginot, Moore & Beck, LLP

(57) ABSTRACT

A method processes segmented iris images obtained by a non-cooperative image acquisition system to generate descriptors for features in the segmented iris image that are tolerant of segmentation error. The method includes receiving a segmented iris image, and selecting feature points in the segmented iris image to describe an iris locally.

14 Claims, 3 Drawing Sheets

SYSTEM AND METHOD FOR NON-COOPERATIVE IRIS RECOGNITION

CLAIM OF PRIORITY

This application claims priority from International Application PCT/US10/20991, which is entitled "System And Method For Non-Cooperative Iris Recognition," and was filed on Mar. 19, 2010. This application claims further priority from U.S. Provisional Application No. 61/161,572 filed on Mar. 19, 2009.

GOVERNMENT LICENSE RIGHTS

This invention was made with government support under contract N00014-07-1-0788 awarded by the Office of Naval Research. The United States government has certain rights in the invention.

TECHNICAL FIELD

The system and method disclosed below relate to personal identification through facial feature recognition, and specifically, to personal identification through iris identification.

BACKGROUND

Systems for identifying persons through intrinsic human traits have been developed. These systems operate by taking images of a physiological trait of a person and comparing information stored in the image to data that corresponds the trait for a particular person. When the information stored in the image has a high degree of correlation to the relevant data previously obtained a particular person's trait, a person can be positively identified. These biometric systems obtain and compare data for physical features, such as fingerprints, voice, and facial characteristics. Different traits impose different constraints on these systems. For example, fingerprint recognition systems require the person to be identified to contact an object directly for the purpose of obtaining fingerprint data from the object. Facial feature recognition systems, however, do not require direct contact with a person and these biometric systems are capable of capturing identification data without the cooperation of the person to be identified.

One trait especially suited for non-cooperative identification is an iris pattern in a person's eye. The human eye iris provides a unique trait that changes little over a person's lifetime. For cooperative iris recognition, the person to be identified is aware of an image being taken and the captured image is a frontal view of the eye. Non-cooperative iris image capture systems, on the other hand, obtain an iris image without a person's knowledge of the data capture. Thus, the subject's head is likely moving and his or her eyes are probably blinking during iris image acquisition. Consequently, the captured image is not necessarily a fully open frontal view of the eye.

Identification of a person from an iris image requires iris image segmentation. Segmentation refers to the relative isolation of the iris in the eye image from the other features of an eye or that are near an eye. For example, eyelashes and eyelids are a portion of an eye image, but they do not contribute to iris information that may be used to identify a person. Likewise, the pupil does not provide information that may be used to identify a person. Consequently, effective segmentation to locate the portions of a captured eye image that contain iris pattern information is necessary for reliable identification of person. Because previously known iris identification systems rely upon the acquisition of eye images from cooperative subjects, iris segmentation techniques have focused on frontal eye images.

Efforts have been made to develop iris image processing methods that accurately identify persons from iris images obtained by a non-cooperative image acquisition system. Once such method proposes use of a Fourier-based trigonometry for estimating two spherical components for an angle of gaze with an affine transformation being used to "correct" the image and center the gaze. This method has limited effectiveness because affine transformations assume the iris is planar, when in fact it has some curvature. The eye is a three dimensional object and the deformed images of iris patterns may present different correlations for the iris patterns. Use of a two dimensional feature extraction model to obtain images for recognition of a three dimensional object is not optimal. Some eyes have patterns that do not change very much when one's gaze changes and these eyes respond well to affine transformation analysis. In general, however, empirical data reveals that many iris patterns do change substantially with a change in gaze and, therefore, identification using images of these iris patterns require a different approach to iris recognition in a noncooperative environment.

Other issues also arise in the non-cooperative imaging of eyes. For example, iris images can be blurred, severely occluded, poorly illuminated and/or severely dilated in addition to presenting an off-angle view of the eye. As an iris gaze changes with respect to a camera lens, the size, shape, and relative centroids of the limbic and pupil regions may change. Given these variables that may lower the quality of iris images, one hundred percent accuracy in segmentation is extremely difficult, and segmentation error in the processing of the image may not be avoidable. Thus, an iris recognition method should be tolerant of segmentation error.

What is needed is a more robust method of identifying an iris from an off-angle view of an eye to identify correctly those portions of an eye image that contain iris pattern data in an eye image obtained from a non-cooperative eye image acquisition system.

SUMMARY

A method processes segmented iris images obtained by a non-cooperative image acquisition system to generate descriptors for features in the segmented iris image that are tolerant of segmentation error. The method includes receiving a segmented iris image, and selecting feature points in the segmented iris image to describe an iris locally. A plurality of bins are imposed on the segmented iris to locally identify features and a two dimensional Gabor wavelet is used to generate the descriptor.

DETAILED DESCRIPTION

Figure 1:
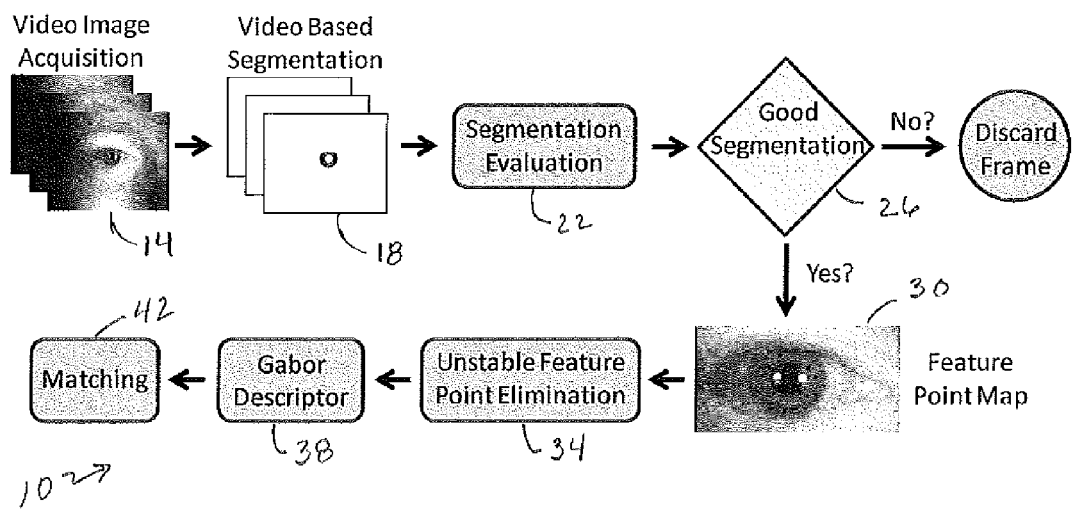
FIG. 1 is a diagram of a process that uses two dimensional Gabor wavelets to identify iris features in an iris image obtained by a non-cooperative eye image acquisition system.

A method for processing iris images obtained by a non-cooperative eye image acquisition system is shown in FIG. 1. The process 10 includes acquisition of video sequences of iris data (block 14), segmentation of the video-based non-cooperative iris images (block 18), evaluation of the segmentation (block 22), retention of the best segmented images (block 26), generation of a feature point map linking feature points to a relative location bin (block 30), elimination of unstable feature points that are low contrast or on an edge (block 34), selection of two dimensional Gabor filtered feature points to represent iris features in the original image (block 38), and comparison of iris images using the Euclidean distances between feature points in the same relative location (block 42). The acquisition of the video sequences is performed in a known manner with known imaging equipment and operational methods. The remainder of the process is now described in more detail.

The segmentation of the video frame data is performed using the method described in co-pending provisional patent application entitled "System And Method For Evaluating Frame Quality And Iris Image Segmentation Quality In A Non-Cooperative Iris Image Acquisition System," having Ser. No. 61/083,628, which was filed on Jul. 25, 2008, the disclosure of which is hereby expressly incorporated herein in its entirety. The method described in this application models the pupil and limbic boundaries using direct least squares fitting of ellipses and detects eyelids, eyelashes and noise using a window gradient based method. A description of this method is now presented. A general conic can be represented by a second order polynomial:

$$F(a, x) = a \cdot x$$
$$= ax^2 + bxy + cy^2 + dx + ey + f$$
$$= 0$$

where $a=[a\ b\ c\ d\ e\ f]^T$ and $x=[x^2\ xy\ y^2\ x\ y\ 1]^T$. This method is called direct least square fitting of ellipse. This quadratic constraint can be expressed in matrix form as $a^T Ca=1$, where $$C = \begin{bmatrix} 0 & 0 & 2 & 0 & 0 & 0 \\ 0 & -1 & 0 & 0 & 0 & 0 \\ 2 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{bmatrix}$$

Now the constrained ellipse fitting problem reduces to minimizing $E=\|Da\|^2$ subject to constraint $a^T Ca=1$, where the design matrix D is defined as $D=[x_1\ x_2\ \ldots\ x_N]^T$. In addition, this method incorporates a quality filter to eliminate images without an eye quickly, and it employs a coarse to fine segmentation scheme to improve the overall efficiency. This method has been shown to be effective in segmenting non-cooperative iris images including off-angle, poorly illuminated, and heavily occluded images.

Evaluation of the pupil and limbic boundaries as well as the mask obtained from the video-based segmentation is now described. The pupil boundary is evaluated using an adaptive threshold to verify the presence of a pupil in a narrow band around the pupil center, which was determined during segmentation, and then the expected pupil and iris regions (maskA) are compared with the mask produced in the segmentation step (maskB):

$$P = \frac{\Sigma(maskA = maskB)}{\text{Total Mask Area}}$$

The iris boundary is evaluated based on the homogeneity of the pixels inside and outside the boundary. Since the iris boundary may include the limbic boundary, eyelids, eyelashes and glare, the boundary is divided into 4 different regions: upper, lower, left and right boundaries. For each region, 20 pixels inside and outside of the detected iris boundary are selected. The boundary is evaluated using the homogenous measure:

$$FO_k(k) = \frac{\Sigma_{(d \in E(k))} W(|c - f(d)|)}{N(E(k))}$$

where, $E(k)$ is the edge with $k^{th}$ pixel distance from the detected iris boundary, c is the estimated iris area pixel value, $f(d)$ is the pixel value at location d, $N(\ )$ is the function to count the number of pixels in $E(k)$, and W is the homogenous function:

$$W(x) = e^{-x^2/2\sigma^2}, x>0$$

where σ is the standard deviation of the iris region offered by the segmentation result. If the detected iris boundary is correct, then the inside edges should have high values while outside edges should have lower values. The boundary accuracy is defined as:

$$g(i) = \left(1 - \frac{\sum_{k=-D}^{-1} FO_i(k)}{\sum_{k=-D}^{D} FO_i(k)}\right) \times 100$$

Here D is the biggest pixel distance selected in the calculation. In one embodiment, D=20. In this way, if the detected boundary is correct, $\Sigma_{k=-D}^{-1} FO_k$ should be low and $g(i)$ should be high. The accuracy of the entire iris boundary detection is calculated as the average accuracy score of the four regions:

$$I = \frac{\sum_{i=1}^{N} g(i)}{N}$$

Figure 2A:
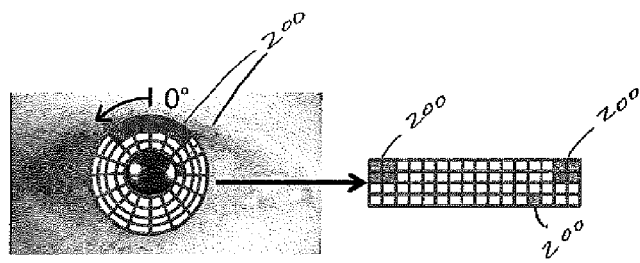
FIG. 2A is an illustration of an iris image region divided into bins for purposes of identifying features in the iris image.
Figure 2B:
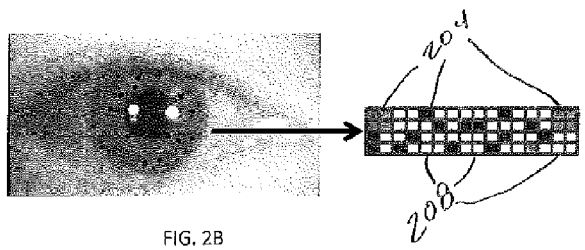
FIG. 2B is an illustration of features in a human eye being mapped to bins for an iris image region.

Selection of the point features in the segmented iris image for iris identification is now described. In the method 10, feature points are used to describe the features of an iris locally as opposed to global approaches previously used. Matching two images by comparing feature points in corresponding locations is much faster and more accurate than can reasonably be expected by comparing all feature points in one image to all feature points in another image. Since iris images are being compared, the feature points on the left side of the pupil in one image should not be matched to the feature points above, below or to the right of the pupil in another image. To facilitate this constraint, the iris region is divided into 720 sub-regions or bins where, no matter the amount of dilation or scale, ten bins are provided between the pupil and limbic boundary and seventy-two bins are provided from 0 to $2\pi$ in the angular direction. For illustration purposes, an iris region so divided is shown in FIG. 2A. The bins shown in that figure demonstrate how an iris area can be divided into multiple bins with bins 200, which include occluded pixels (eyelids, eyelashes, or glare) being masked entirely. Since the pupil and limbic boundaries are modeled as ellipses, the sizes of these sub-regions vary in the radial direction for each of the seventy-two angular bins. In this way, a normalized map of size 10 by 72 is formed where each bin can potentially have a feature point with a total of 720 feature points possible. This map differs from previously known methods in that the entire iris area can potentially have feature points and every bin size changes with dilation. FIG. 2B shows how some bins 204 contain a feature point corresponding to a point in the annular iris region, whereas bins 208 do not. (Note: For ease of viewing, the images in FIG. 2A and FIG. 2B do not show all of the 720 bins being used in each image.) Bins 204 correspond to the features represented by dots in the iris image of FIG. 2B. In addition, to compensate for feature points that are on the boundaries of sub-regions, a second 10 by 72 normalized feature point map is generated with a 5 degree angular offset.

Difference of Gaussian (DoG) filters are used to find stable feature points within an iris image. Stability of feature points is important since the same feature in two image must be compared from the same point of reference. To find stable feature points, the first step is to apply a nominal Gaussian blur, which results in I(x,y).

$$G(x, y) = \frac{1}{2\pi\sigma_n^2} e^{-(x^2+y^2)/2\sigma_n^2}$$

where $\sigma_n=0.5$. Then the nominally blurred image, I(x,y), is progressively Gaussian blurred. The first Gaussian image is generated using $$g_\sigma = \sqrt{\sigma_0^2 + \sigma_n^2}$$

where $\sigma_0 = 1.5\sqrt{2}$ so that $$G(x,y,1) = G_{g_\sigma} * I(x,y).$$

Figure 3:
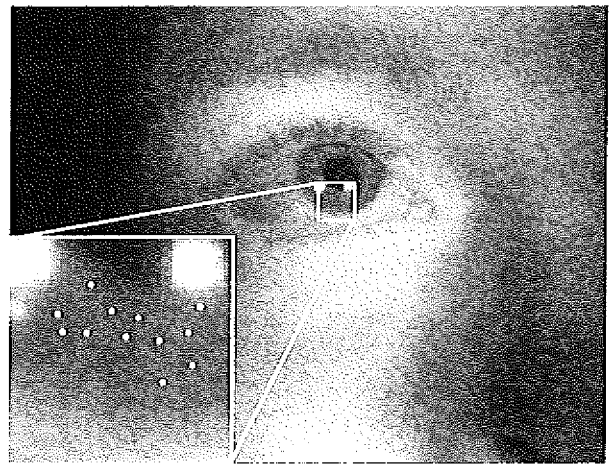
FIG. 3 depicts stable features in an iris image.

The remaining Gaussian images are generated using $\sigma=1.5(\sqrt{2})^m$ (m=0, 1, 2, 3), which results in five Gaussian blurred images (G(x,y,s) (s=0, ..., 4)). The size of the Gaussian filter is always the closest odd number to $3\sigma$. These parameters were selected empirically and are the same for all images. Then four DoG images are generated by subtracting each Gaussian image from the previous Gaussian image in scale: D(x,y,s)=G(x,y,s+1)−G(x,y,s) (s=0, 1, 2, 3). For D(x,y,1) and D(x,y,2), the local minima and maxima with the highest magnitude of all the points contained within the sub-region are stored so that every sub-region contains two potential feature points, one scale apart, unless some portion of the sub-region is occluded or masked due to noise. This operation provides only one potential feature point per scale within a defined sub-region and only two scales are used since the scale of useful iris images is not changing drastically due to a constant camera focal length. These constraints increase the opportunity to correctly match feature points within a similar relative position with respect to the pupil across multiple iris images. Once potential feature points are identified and mapped to the feature point map, a known three dimensional quadratic method is used to eliminate unstable feature points. FIG. 3 shows an example of stable feature points found for an iris.

In order to capture the iris features around a given feature point, a bank of two dimensional (2-D) Gabor filters are used with the angle and width of each filter changing based on the angle of a feature point with respect to the pupil centroid and the distance between the pupil and limbic boundary around the feature point, respectively. For each feature point, a feature description of length 64 is generated based on a normalized Gaussian weighted position for each point within a normalized window around a feature point (4 x-bins and 4 y-bins) and the magnitude and phase response (4 phase orientation bins). The window size is determined as $$W = \text{floor}\left(\sqrt{2} \cdot S_A \cdot \frac{N+1}{2} + .5\right),$$

where $S_A=5$ and $N=4$. $S_A$ is the spatial extension of the frame around the feature point in the angular direction that is used to normalize the window around that feature point and is based on experimental results. N is the number of bins used to describe the relative position of a point to a feature point. The difference between the x and y values of each point in the window and the feature point (dx and dy) are used to find the normalized x and y values:

$$(nx, ny) = \left(\frac{dx\cos\theta + dy\sin\theta}{S_R}, \frac{-dx\sin\theta + dy\cos\theta}{S_A}\right).$$

Figure 4:
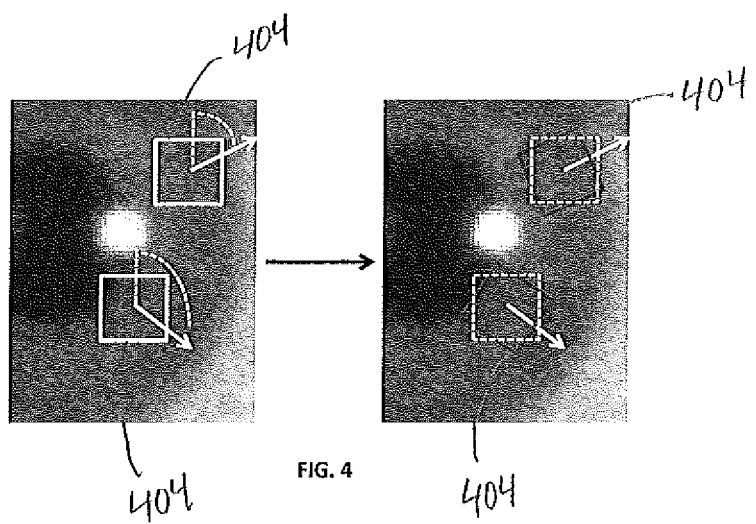
FIG. 4 depicts normalized windows and rotations for processing stable features in a segmented iris image.

$S_R$ is the spatial extension around the feature point in the radial direction that is used to normalize the window around that feature point and changes in size are based on the amount of dilation. $S_R=S_A$ if the iris is dilated such that the distance from the pupil center to the pupil boundary is 50% of the distance from the pupil center to the limbic boundary around the feature point. $S_R<S_A$ if the dilation is greater than 50% and $S_R>S_A$ if the dilation is less than 50%. $\theta$ is the angle of the feature point with respect to the pupil center and is used to orient the window around the feature point such that the same feature point in another image is able to be matched despite differences in angular position with respect to the pupil center. Some points may no longer be in the window because the normalized window can be rotated based on the relative orientation. Therefore, only points within a window of N/2 are used for the feature descriptor. FIG. 4 shows a window 404 of points around two feature points being rotated to match their respective angles in reference to the pupil center. (Note: Each feature descriptor is generated using the annular iris image. Thus, the iris region is not sampled or transformed until the iris features are extracted using the 2-D Gabor wavelet, which acts as a bandpass filter.)

For each point in the normalized window around the feature point, the magnitude and phase response of the appropriate 2-D Gabor wavelet are calculated with the wavelet centered on the point being considered. The magnitude is then Gaussian weighted based on the relative spatial distance from the feature point so that points in the window closest to the feature point carry the most weight and points further away carry less. The weight of the Gaussian, wn, is calculated as:

$$wn = e^{-.5\left(\frac{(nx)^2}{2\sigma_x^2} + \frac{(ny)^2}{2\sigma_y^2}\right)}$$

where $\sigma_y = N/2$ and $\sigma_x$ changes based on the dilation around the feature point. Finally, the weight of each point is calculated as:

$$\text{weight} = wn \cdot mg$$

where mg is the magnitude response of the 2-D Gabor wavelet, and weight is added to one of 64 bins based on relative distance from the feature point and quantized phase response of the 2-D Gabor wavelet. The resulting 64 bin feature point descriptor is then normalized to a unit vector by dividing by the 2-norm of the descriptor:

$$descr_{norm} = \frac{descr}{\|descr\|_2}.$$

Since each descriptor is normalized, the relative difference in magnitude response from the 2-D Gabor filter remains the same for the same points around a feature point across iris images with different global illumination. Because phase is not affected by illumination, the same points in two iris images affect the same descriptor bins. Therefore, each feature point descriptor generated has each of the 64 bins uniquely affected by the surrounding points based on distance from the feature point and the 2-D Gabor wavelet response magnitude and phase. Thus, an accurate descriptor is formed based entirely from the annular iris data.

This approach differs from known methods in several ways. Most significant is the use of the 2-D Gabor filter to extract the iris features and describe each feature point as opposed to using the local gradient magnitude and orientation. In addition, the window around a feature point is specifically adjusted for each iris based on dilation so that the same iris at a different scale and with varying dilation can be correctly matched. More subtly, only 64 bins are used in the descriptor because 128 bins were found to be more susceptible to errors from noise.

Figures 5A, 5B, 5C, 5D, 5E:
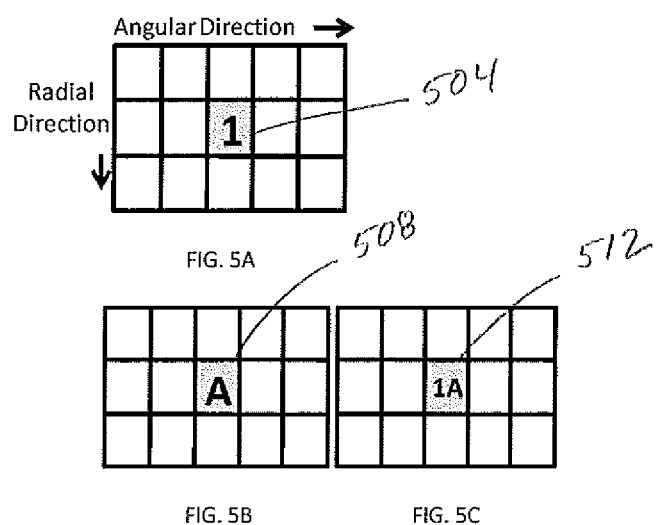
FIG. 5A depicts a feature point in a bin for an iris image A.
FIG. 5B depicts a feature point in a bin for an iris image B that corresponds to the bin having a feature in image A of FIG. 5A.
FIG. 5C depicts a comparison of the features in the corresponding bin of image A and image B.
FIG. 5D depicts features in bins for an iris image C.
FIG. 5E depicts a comparison of the feature in the bin of image A to the features in the bins of image C that are proximate to the bin containing the feature in image A to attenuate sensitivity to segmentation error in the matching of image A to image C.

Iris image matching is now described. To match two iris images, the set of two 10 by 72 feature point maps are compared to find which overlapping sub-regions contain feature points and the Euclidean distance is found between each feature point descriptor. In other words, one of the feature point maps from image A is compared to a feature point map from image B and for each sub-region between the two feature maps that both contain a feature point, the Euclidean distance is calculated, normalized to fall between 0 and 1, and then stored in memory. The final distance score between two feature maps is the average of the distance scores between all overlapping feature points. FIG. 5A and FIG. 5B illustrate the matching of feature points. Given a feature point 504 in image A, FIG. 5A, and a feature point 508 in the corresponding bin in image B, FIG. 5B, these two points are directly matched and produce a single comparison 512, FIG. 5C. Since there are two feature point maps for each iris image, four complete comparisons are made and the minimum average Euclidean distance is found to be the matching distance between two iris images. Recall that the two feature point maps for an iris image describe the same regions, but are offset by 5 degrees. This is done in order to accommodate feature points that fall on boundaries of sub-regions within a feature point map.

Segmentation of a non-ideal iris image can be difficult, so despite success using the video-based non-cooperative iris image segmentation discussed above, allowances need to be made for segmentation error when matching two feature point maps. Additionally, compensation for up to ten degrees of rotation is required for possible rotation of an iris image occurring from natural head movement. Therefore, each feature point in a feature point map in image A in FIG. 5A is compared to each feature point in the fifteen surrounding bins (two bins on either side and one bin above and below) in a feature point map for an image C in FIG. 5D, and the minimum average distance score is stored for the two feature point maps compared. FIG. 5E shows how the feature point in FIG. 5A is compared to each of the surrounding feature points in FIG. 5D. In this way, the proposed method is less sensitive to the segmentation error that may occur in non-ideal iris images since feature points can occur anywhere within a bin and allowances are made to maximize the opportunity for the same two feature points in two images to be compared. Methods that sample the iris region and encode globally require more stringent segmentation results so as to correctly match each encoded point.

Those skilled in the art will recognize that numerous modifications can be made to the specific implementations described above. While the embodiments above have been described with reference to specific applications, embodiments addressing other applications may be developed without departing from the principles of the invention described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for processing segmented iris images comprising:
   receiving a segmented iris image;
   dividing an iris region in the segmented iris image into a plurality of bins.
   dividing the iris region in the segmented iris image into a second plurality of bins angularly offset from the first plurality of bins to include iris features at edges of bins in the first plurality of bins;
   selecting feature points in the segmented iris image to describe an iris locally;
   comparing selected feature points in a first location in the segmented iris image to feature points at a corresponding location in another iris image; and
   detecting a correspondence between the segmented iris image and the other iris image in response to the Euclidian distance between the selected feature points in the first location in the segmented iris image and the feature points at the corresponding location in the other iris image being less than a predetermined threshold.

2. The method of claim 1 further comprising:
   masking bins corresponding to one of an eyelid feature, an eyelash feature, and glare.

3. The method of claim 1 further comprising:
identifying stable feature points in the first plurality of bins.

4. The method of claim 3, the identification of the stable feature points further comprising:
generating a set of blurred iris images for stable feature selection by computing differences between a series of Gaussian blurred iris images of the segmented and divided iris image, each Gaussian blurred iris image in the series of Gaussian blurred iris images being progressively blurred from a previously Gaussian blurred iris image in the series;
selecting feature points with reference to a local minima and a local maxima having the highest magnitude of all points within a bin of a blurred iris image in the set of iris images;
mapping the selected feature points to a feature point map; and
eliminating unstable feature points from the feature point map with a three dimensional quadratic method to identify stable feature points.

5. The method of claim 4 further comprising:
generating a feature descriptor for each stable feature point.

6. The method of claim 5, the generation of the feature descriptor further comprising:
generating a Gaussian weighted position for each stable feature point within a normalized window about each stable feature point.

7. The method of claim 6, the generation of the Gaussian weighted positions further comprising:
generating a magnitude and a phase response for each point within the normalized window to a two-dimensional (2-D) Gabor wavelet; and
generating the feature descriptor with reference to the magnitude response of the 2-D Gabor wavelet with reference to a spatial distance between the point for which the magnitude was generated and the stable feature point in the normalized window and a quantized phase response of each point in the normalized window to the 2-D Gabor wavelet.

8. The method of claim 7 further comprising:
normalizing the feature descriptor to a unit vector.

9. A method for processing iris images comprising:
receiving a first image corresponding to an iris of an eye having a first dilation and a second image corresponding to the iris of the eye having a second dilation;
generating a first plurality of bins in a rectangular arrangement, each bin in the first plurality of bins corresponding to a predetermined region in the first image;
generating a second plurality of bins in the rectangular arrangement, each bin in the second plurality of bins corresponding a predetermined region in the second image, at least one of the predetermined regions in the second image having a different size than a corresponding predetermined region in the first image and each bin in the second plurality of bins corresponding to one bin in the first plurality of bins;
identifying at least one stable feature in one bin of the first plurality of bins and a corresponding bin in the second plurality of bins;
generating a first feature descriptor with a Gabor filter applied to the one bin in the first plurality of bins and a plurality of bins proximate to the one bin in the first plurality of bins;
generating a second feature descriptor with the Gabor filter applied to the corresponding bin in the second plurality of bins and another plurality of bins proximate to the second bin in the second plurality of bins;
identifying a Euclidean distance between the first feature descriptor and the second feature descriptor; and
identifying that the first image and the second image correspond to a single iris in response to the identified Euclidean distance being less than a predetermined threshold.

10. The method of claim 9, the identification of the at least one stable feature in the first plurality of bins further comprising:
generating a set of blurred iris images by computing differences between a series of Gaussian blurred iris images of the first image, each Gaussian blurred iris image in the series of Gaussian blurred iris images being progressively blurred from a previously Gaussian blurred iris image in the series;
selecting a feature with reference to a local minima and a local maxima having the highest magnitude of all points within a bin of a blurred iris image in the set of iris images;
mapping the selected feature to a feature point map; and
eliminating unstable features from the feature point map with a three dimensional quadratic method to identify at least one bin in the first plurality of bins corresponding to a stable feature.

11. The method of claim 9, the generation of the first feature descriptor further comprising:
generating a Gaussian weighted position for the at least one stable feature within a normalized window of bins about the bin corresponding to the stable feature.

12. The method of claim 11, further comprising:
generating a magnitude and a phase response for each point within the bins in the normalized window to a two-dimensional (2-D) Gabor wavelet; and
generating the feature descriptor with reference to the magnitude response of the 2-D Gabor wavelet with reference to a spatial distance between the point for which the magnitude was generated and the first stable feature in the normalized window and a quantized phase response of each point in the normalized window to the 2-D Gabor wavelet.

13. The method of claim 9 further comprising:
masking bins in each of the first plurality of bins and the second plurality of bins corresponding to one of an eyelid feature, an eyelash feature, and glare.

14. The method of claim 9 further comprising:
generating a third plurality of bins in a rectangular arrangement, each bin in the third plurality of bins corresponding to a predetermined region in the first image that is offset in an angular direction from a corresponding bin in the first plurality of bins to include at least one feature between edges of bins in the first plurality of bins.

* * * * *